United States Patent Office 3,658,840
Patented Apr. 25, 1972

3,658,840
THIOPHOSPHORUS ACID-N-VINYL
PHTHALIMIDE ADDUCTS
Alexis A. Oswald, Mountainside, N.J., assignor to Esso
Research and Engineering Company
No Drawing. Filed Jan. 2, 1969, Ser. No. 788,624
Int. Cl. C07d 27/52
U.S. Cl. 260—326 E    7 Claims

ABSTRACT OF THE DISCLOSURE

Diorgano thiophosphorus acids, such as dihydrocarbyl dithio- and monothiophosphoric acids, O-alkyl dithiophosphonic acids, dihydrocarbyl dithiophosphinic acids, etc., can be readily added to N-vinyl compounds. On addition the corresponding Markovnikov type adducts, i.e. neutral S-substituted α-aminoethyl phosphorus esters are formed in the presence and in the absence of added ionic catalysts. The adducts are useful as pesticides, particularly for the control of animal and plant pests such as insects, mites and fungi. The pesticidal effectiveness of the adducts derived from N-vinyl substituted cyclic imides and amides is surprisingly superior to structurally related known pesticides.

FIELD OF THE INVENTION

This invention relates to novel, selective addition processes comprising reacting a thiophosphorus acid with an N-vinyl compound. More particularly, this invention relates to the selective cationic addition of diorgano thiophosphorus acids to N-vinyl compounds to form novel Markovnikov-type adducts, i.e. neutral α-nitrogen-substituted S-ethyl esters of the corresponding acid. These novel adducts are useful as plant and animal pesticides particularly as insecticides, miticides and fungicides.

PRIOR ART

Esters of thiophosphorus acids represent an important class of compounds particularly useful as pesticides (see the Monograph "Die Entwicklung of neuer insektizider Phosphorsäure-Ester" by G. Schrader published by Verlag Chemie GmbH, Weinheim/Bergstr., W. Germany, 1963). The importance of selected members of this class has stimulated interest in novel organophosphorus compounds and in improved methods for preparing these compounds.

Several β-nitrogen substituted S-ethyl esters of dialkyl thiophosphoric acids are known as pesticides. U.S. Pat. 2,902,493 describes their synthesis from β-nitrogen substituted halides by displacement reactions with the acid salts. Similar reactions are described in several U.S. Pats. (2,767,194; 2,758,115; 2,843,588) for the synthesis of α-nitrogen substituted methyl esters, which are also useful as pesticides. Finally, the synthesis of the α-halomethyl derivatives of the above esters is also disclosed in U.S. Pat. 3,355,353. All these reactions are described by the following general reaction equation:

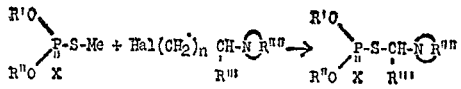

wherein R' and R" are alkyl groups, R''' is hydrogen and chloromethyl, R'''' is a divalent organic radical, Hal is chlorine or bromine, Me is a metal or ammonium, $n$ is 0 and 1, and X is O and S.

α-Cyclic nitrogen substituted ethyl esters of thiophosphoric and other thiophosphorus acids, however, have previously been unknown. The present invention describes their preparation via selective addition of thiophosphorus acids to the corresponding N-vinyl compounds.

The addition of diorgano thiophosphorus acids especially of dihydrocarbyl dithiophosphoric acids to several types of olefinic compounds is known (see pages 708 to 720 of the Monograph "Organoische Phosphorverbindungen," by K. Sasse, volume XII, part 2 of the Houben-Weyl series "Methoden der Organischen Chemie," edited by E. Mueller and published by G. Thieme Verlag, Stuttgart, Germany, 1964. Depending on the type of the olefin and the reaction conditions, thiophosphorus acids can be added to the olefinic bond by cationic, anionic and radical type mechanisms, all leading to different products. The usefulness of some of the adducts stimulated interest in selective reactions involving different types of olefinic compounds. However, no thiophosphorus acid additions to N-vinyl compounds have been studied heretofore.

It has now surprisingly been found that cationic addition of thiophosphorus acids to N-vinyl compounds, particularly to N-vinyl imides, can be carried out selectively under mild conditions to yield stable adducts having outstanding pesticidal activity. For example, the dialkyl dithiophosphoric acid-N-vinyl phthalimide adducts (I) show pesticidal properties superior to their known desmethyl homologs II.

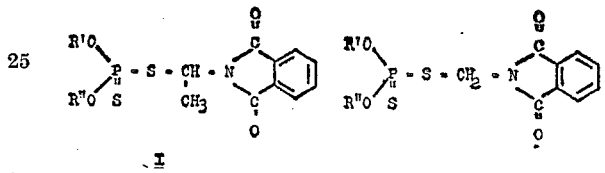

The new adducts are secondary alkyl esters and as such would be expected to be inferior pesticides from the viewpoint of lesser stability (see page 422 of the referred monograph by G. Schrader). Furthermore, the substitution of an α-hydrogen in II by methyl to yield I would have been expected heretofore to have been accompanied by a decrease in the inherent pesticidal activity (see pages 405 and 406 in volume 19 of the Journal of Scientific Food and Agriculture from the year 1968, in an article by M. Pianka). Unexpectedly, it has been found in the present invention that type I compounds are superior to the known type II compounds.

SUMMARY OF THE INVENTION

In accordance with this invention a diorgano thiophosphorus acid can be added to the olefinic unsaturation of an N-vinyl compound with a cationic and/or radical type mechanism to yield the corresponding neutral S-(α-and/or β-nitrogen substituted) ethyl esters.

The thiophosphorus acid reactants of the present invention are of the general formula:

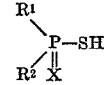

wherein X is sulfur or oxygen, and $R^1$ and $R^2$ represent a $C_1$ to $C_{30}$ organic radical, preferably an unsubstituted or mono-substituted hydrocarbyloxy, hydrocarbylthio, and/or hydrocarbyl group.

Although, in general, $R^1$ and $R^2$ can include $C_1$ to $C_{30}$ organic radicals, preferable radicals are those having $C_1$ to $C_8$ carbon atoms and, most preferably, $C_1$ to $C_4$ carbon atoms.

The organic radicals are preferably $C_1$ to $C_8$ hydrocarbyloxy, hydrocarbylthio and hydrocarbyl radicals and most preferably $C_1$ to $C_4$ alkyloxy, alkylthio and alkyl groups.

$R^1$ and $R^2$ can represent an identical organic group. If $R^1$ and $R^2$ are identical it is preferred that they either be methoxy or ethoxy. If $R^1$ and $R^2$ are different it is preferred that $R^1$ be a methoxy or ethoxy group and $R^2$ be methyl, ethyl, or $C_1$ to $C_4$ alkylthio.

The hydrocarbyloxy, hydrocarbylthio and hydrocarbyl radicals can be also substituted. Monosubstitution is preferred. Suitable substituents include hydrocarbylthio, preferably $C_1$ to $C_4$ alkylthio; hydrocarbyloxy, preferably $C_1$ to $C_4$ hydrocarbyloxy, etc.

The organic radicals suitable for $R^1$ and $R^2$ include aromatic, unreactive olefinic and acetylenic radicals. These radicals can be substituted such as chlorovinyl, cyanophenyl, etc.

Non-limiting, representative examples of suitable $R^1$ and $R^2$ groups include: cetyloxy, hexadecylphenylthio, naphthyloxy, methloxy, ethylthio, propylthio, methyl, hydroxymethyl, propyloxymethyl, chlorovinyl, propargylthio, crotylthio, phenyl, phenylthio, xylyl, benzylthio, chlorophenyl, ethylthio, butylthio, ethoxy, ethyl, chloromethyl, chloropropyl, dichlorovinyl, methylthioethyl, ethylsulfonylmethyl, cyanoethyl, propenylthio, etc.

Preferred types and ranges of thiophosphorus acids are shown by the following tabulation.

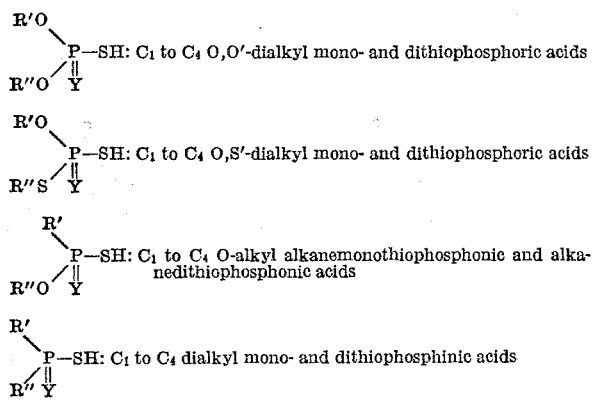

wherein $R'$ and $R''$ in each of the above type acids are $C_1$ to $C_4$ alkyl groups, Y is sulfur or oxygen, etc.

Examples of useful thiophosphorus acids include: dimethyl dithiophosphoric acid, diethyl dithiophosphoric acid, dicetyl dithiophosphoric acid, dioctyl dithiophosphoric acid, diphenyl dithiophosphoric acid, dicrotyl monothiophosphoric acid didodecylphenyl dithiophosphoric acid, dichlorophenyl dithiophosphoric acid, dibenzyl monothiophosphoric acid, O-ethyl-S-propyl dithiophosphoric acid, O-ethyl-S-propenyl dithiophosphoric acid, O-methyl-S-butyl dithiophosphoric acid, O-ethyl S-ethyl dithiophosphoric acid, O-ethyl S-benzyl dithiophosphoric acid, O-propyloxymethyl S-propyl dithiophosphoric acid, O-ethyl ethanedithiophosphoric acid, O-methyl methanedithiophosphoric acid, O-ethyloxy propyloxymethanedithiophosphoric acid, O-ethyloxy chloromethanedithiophosphoric acid, O-ethyl benzenedithiophosphoric acid, O-ethyl methylthioethenedithiophosphonate, O-ethyl hydroxyethanethiophosphoric acid, O-ethyl methylsulfonylmethanedithiophosphonic acid, dimethyl dithiophosphinic acid, diphenyl dithiophosphinic acid, dichlorovinyl dithiophosphinic acid, dipropargyl thiophosphinic acid.

The N-vinyl compound reactants of this invention are of the general formula $$(CH_2=CH-N^{III})_m(R^3)_n$$

wherein $R^3$ is a mono or divalent $C_1$ to $C_{30}$ organic radical, $m$ is 1 to 3, preferably 1, and $n$ is 1 to 3, preferably 1. The nitrogen is in a trivalent form; consequently the values of $m$ and $n$ have a definite interdependence. In case of a monovalent organic $R^3$ group, the general formula of the reactant is the following $$CH_2=CH-N(R^3)_2$$

and it is preferred that at least one of the two organic radicals should have an aromatic rather than aliphatic character. When $R^3$ is divalent organic radical, it is preferably bound to the same nitrogen:

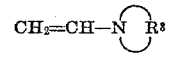

The $R^3$ organic radical preferably has from 1 to 14 carbon atoms. The organic radicals are preferably selected from alkyl, phenyl, substituted phenyl, heterocyclic, substituted heterocyclic and acyl monovalent radicals and bivalent organic radicals forming a cyclic moiety with the nitrogen. It is particularly preferred that the bivalent organic radicals be an acyl or diacyl radical. The acyl group is preferably derived from carboxylic, thiocarboxylic, carbonic, carbamic, or sulfonic acids, etc. The reactants containing these radicals are classified as N-vinyl derivatives of cyclic amides and imides. Such reactants in the case of carboxylic acid derivatives can be represented by the following general formulae:

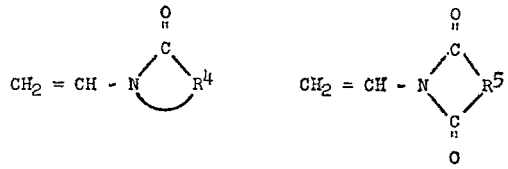

wherein $R^4$ is preferably a $C_1$ to $C_{13}$ divalent organic radical and $R^5$ is preferably a $C_1$ to $C_{12}$ divalent organic radical. Non-limiting preferred examples of $R_5$ include ethylene, cyclohexylene, and phenylene. It is also preferred to have organic radicals for $R^4$ and $R^5$ which contain heteroatoms such as nitrogen, sulfur, oxygen, etc.

In the case of N,N'-divinyl and N,N',N'''-trivinyl compounds, several nitrogen atoms can be part of one cyclic moiety. For example, 4,4-diorgano 1,3-divinyl hydantoins

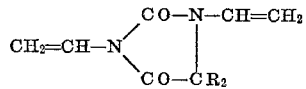

can be used as reactants of this type.

Preferred examples of the N-vinyl compound reactants include:

Vinyl diphenylamine, vinyl methylnaphthylamine, vinyl acridone, vinyl dimethylpyrazole, vinyl pyrrole, vinyl indole, vinyl benzotriazole, vinyl naphthoimidazole, vinyl methylimidazoline, vinyl phenylimidazoline, vinyl benzylimidazoline, vinyl carbazole, vinyl tetrahydrocarbazole, vinyl imidazole, vinyl benzimidazole, vinyl tetrahydropyrimidine, vinyl phenothiazine, vinyl naphthophenothiazine, vinyl methylacetamide, vinyl ethylisobutyramide, vinyl acetanilide, vinyl N-methyl benzamide, vinyl N-methyl methanesulfonamide, vinyl N-methyl chlorobenzenesulfonamide, vinyl succinimide, vinyl glutarimide, vinyl diglycolimide, vinyl phthalimide, vinyl chlorophthalimide, vinyl dichlorophthalimide, vinyl tetrachlorophthalimide, vinyl nitrophthalimide, vinyl tetrahydrophthalimide, vinyl methylthiosuccinimide, vinyl naphthalimide, vinyl saccharin, N,N'-divinyl maleic hydrazide, vinyl pyrrolidone, vinyl thiopyrrolidone, vinyl methylpyrrolidone, vinyl benzylpyrrolidone, vinyl piperidone, vinyl caprolactam, vinyl oxazolidone, vinyl oxazidone, vinyl morpholinone, vinyl dimethylhydantoin, vinyl carbethoxymethylhydantoin, vinyl phenyl undecyl hydantoin, divinyl dimethylhydantoin, divinyl methylthienylhydantoin, vinyl benzazimide, vinyl mercaptobenzothiazole, vinyl thiadiazolone, etc.

The N-vinyl compound reactants of the present invention can be advantageously prepared by the vinylation of the corresponding secondary amines, N-monosubstituted amides and imides by acetylene (see Volume II of the Monograph "Acetylene" by S. A. Miller, Academic Press, New York, 1966, pages 323–355). It is also described (in the same reference) that N-vinyl compounds are readily polymerized by irradiation, peroxides, heat and acids.

It was found surprisingly that on the addition of thiophosphorus acids, which have acid strength comparable to nitric acid, N-vinyl compounds do not polymerize but instead yield monoadducts. The addition occurs in the liquid phase in the presence and also in the absence of solvents. Since many of the N-vinyl compounds and the adducts formed are solids or viscous liquids at room temperature, the addition of a solvent is often advantageous. Suitable solvents include oxy and thioethers, ketones, alcohols, esters, aromatic hydrocarbons, chlorinated hydrocarbons, nitriles. Examples of preferable solvents include tetrahydrofuran, dimethyl sulfide, acetone, methanol, ethylacetate, toluene, chloroform, etc. Some of the solvents such as methanol may also be used for the recrystallization of the crude solid adduct. Usually up to about 20 volumes, preferably up to about 5 volumes, of solvent are used per volume of process reactants.

The addition reaction is carried out at temperatures in the range of about −100 to about +150° C., preferably about −50 to about +120, most preferably about −20 to about +80° C. α-cyclic nitrogen substituted ethyl esters of thiophosphoric and other thiophosphorus acids, however, have previously been unknown. The present invention describes their preparation via selective addition of thiophosphorus acids to the corresponding N-vinyl compounds. Typically, the reaction is conducted with approximately equimolar amounts of the two reactants. An excess of the thiophosphorus acid can be used as an acid catalyst to convert all or at least substantially, the N-vinyl compound. Alternatively, less than an equimolar amount of the acid can be slowly added to an acid sensitive N-vinyl compound to avoid polymerization as a side reaction. The molar ratio of the thiophosphorus acid to the N-vinyl compound can preferably vary from 2:1 to 1:2. However, the particularly preferred ratios are between 1.5:1 to 1 to 1.5.

In general, the addition reactions are conducted at atmospheric pressure. However, special reaction conditions such as the use of a very low boiling solvent may result in the use of superatmospheric pressures, preferably under 5 atmospheres.

The monoaddition reactions proceed well under the above conditions within the specified temperature limits either in the presence or in the absence of added catalysts. In general, the reactions reach substantial conversion and yield the desired monoadducts in excess of 40% of the calculated amounts within 0.1 to 100 hours, preferably 0.5 to 12 hours. The longer reaction times can be drastically cut by the application of higher reaction temperatures and/or reaction catalyst or initiators in production.

The selective monoaddition reaction of thiophosphorus acids to N-vinyl compounds can yield two isomeric products. For the cyclic N-vinyl compounds this is shown by the following general reaction scheme

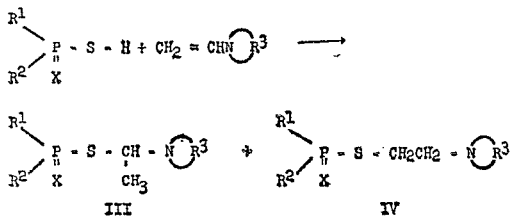

The α-N substituted S-ethyl ester III is the product of an electrophilic addition reaction. This reaction probably occurs via a cationic mechanism involving the addition of a proton as the primary step:

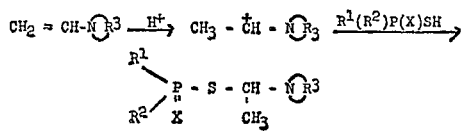

The rate of an electrophilic reaction is dependent on the strength of the thiophosphoric acid. It was found in the present invention that thiophosphoric acids are strong enough to effect selective additions yielding III as the main monoadduct isomer. The reaction rate, however, can be increased by adding any acid having a $pK_a$ greater than the thiophosphorus acid addend. Typical examples of the acids that can be employed are perchloric, sulfuric, phosphoric, polyphosphoric, methanesulfonic, benzenephosphonic acids, and boron trifluoride. The acid is normally employed in catalytic amounts, i.e. about 0.01 to about 10 wt. percent of the reaction mixtures, preferably about 0.05 to about 5 wt. percent.

The rate of the formation of isomer III is also dependent on the structure of the N-vinyl reagent used. N-vinyl amines react in an electrophilic manner with thiophosphorus acids at a very fast rate in the absence of added extra acid catalysts. N-vinyl amides are less reactive, but still do not require added acid catalysts. The use of an acid catalyst can be required, however, in the case of vinyl imides. The increasing substitution of the nitrogen by electronegative acyl groups reduces the electrophilic reactivity of the vinyl substituent. It is indeed surprising that the vinyl imides are reactive towards thiophosphorus acids in cationic additions.

The rate of cationic additions is considerably increased by raising the reaction temperature. Increased temperature can be an advantageous alternative to the addition of extra acid catalyst. The upper limit of the temperature is determined by the stability of the two reagents. For selective cationic additions to N-vinyl amides and imides, temperatures above about 0° C. are preferred. Most preferably, such additions are carried out between about 20 and about 100° C.

The β-N-substituted S-ethyl ester product, IV, is formed by a free radical type reaction. This reaction occurs via a chain mechanism involving the following steps:

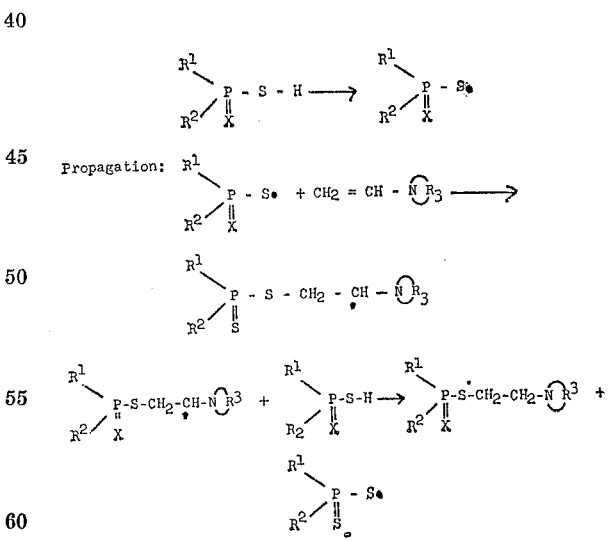

The initiation step is believed to involve the homolysis of an S—H bond and, accordingly, can be effected by radical type chemical initiators and radiation. Suitable chemical initiators include peroxides, azo compounds such as t-butyl hydroperoxide, benzoyl peroxide, azo-bis-i-butyronitrile, etc. Means of initiation by radiation include ultra violet and gamma irradiation.

The rate of the free radical reaction, once initiated, does not depend strongly on the temperature. Subsequently, it is preferable to carry out such reactions at lower temperatures to avoid the concurrent formation of cationic adduct isomers. In general, for the selective free radical addition of thiophosphorus acids to N-vinyl compounds the reaction temperature should be below 50° C. The lower limit of the temperature range is determined by the melting vs. freezing temperature of the reaction mixtures and the solubility of the reaction components. The preferable temperature range is between about —50 and about +30° C., most preferably between about —30 and about +5° C.

For a low temperature initiation of radical type additions, radiation is particularly suitable. Chemical initiators decomposing at low temperatures such as the peroxides formed from boron alkyls can be also employed. The effectiveness of the radical initiation is also dependent on the absence of inhibitors. The reactants can be especially purified to remove such inhibitors.

Finally, the degree of success for a selective radical type addition is also related to the type of N-vinylic compound used. Under similar conditions, higher selectivity can be attained for imides than amines because of the different rates of the competing electrophilic additions.

The liquid reaction mixtures obtained via the described addition process usually still contain some unreacted thiophosphorus acid. This and any other acid is usually removed before further heating. The removal can be readily effected by the conversion of the acids into water soluble alkali or ammonium salts. After the removal of the acid, the crude product can be used as such or further purified.

Several of the adducts are crystalline solids at room temperature and as such can be crystallized and recrystallized from alcohols and other suitable solvents.

The selective cationic additions of the present invention result in novel compositions, i.e. α-N substituted S-ethyl esters of diorgano thiophosphorus acids having the general formula $$\left[\begin{array}{c}R^1\\ \diagdown\\ R^2\diagup\overset{\|}{X}\end{array}P-S-\underset{\underset{CH_3}{|}}{CH}-N^{III}\right]_m(R^3)_n$$

wherein R¹ and R² are monovalent C₁ and C₃₀ organic radicals, preferably unsubstituted or monosubstituted hydrocarbyloxy, hydrocarbylthio and hydrocarbyl radicals, and more preferably are the same radicals with one to eight carbon atoms, most preferably C₁ to C₄ alkyloxy, alkylthio and alkyl groups; X is sulfur or oxygen; R₃ is a C₁ to C₃₀ organic mono- or divalent radical, at least one of which has an aromatic moiety, preferably a C₁ to C₁₄ organic mono- or divalent radical containing oxygen, sulfur, nitrogen, halogen, besides carbon and hydrogen, preferable radicals including alkyl, phenyl, substituted phenyl, heterocyclic, substituted heterocyclic, etc., said divalent organic radicals most preferably forming a cyclic moiety with the vinyl nitrogen, m is 1 to 3, preferably 1, and n is 1 to 3, preferably 1. The interdependence of m and n is determined by having the nitrogen atoms in a three valent form.

In a more specific embodiment, such compositions include those of the general formula:

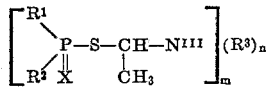

wherein the meaning of the symbols is as previously defined except that R³ can be only a monovalent and not a divalent organic radical.

In another specific embodiment, the new compositions include S-(α-cyclic N-substituted) ethyl esters of thiophosphorus acid of the general formula

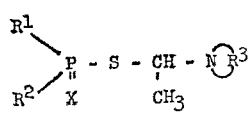

wherein R³ is a C₁ to C₁₄ divalent organic radical, preferably a C₁ to C₁₄ divalent organic acyl radical, including radicals formally derived from carboxylic, carbonic, carbamic, and sulfonic acids and their thio analogs; R¹ and R² are C₁ to C₃₀ organic radicals, preferably unsubstituted or monosubstituted hydrocarbyloxy, hydrocarbylthio and hydrocarbyl groups containing C₁ to C₈ carbon atoms.

Another more specific embodiment of the α-N-substituted S-ethyl esters of diorgano thiophosphorus compounds of this invention includes a special class of compositions i.e. S-(α-substituted amido)ethyl esters of thiophosphorus acid.

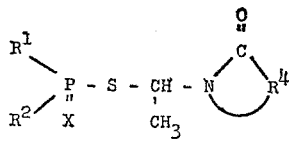

wherein R¹, R² and X are as previously defined and wherein R⁴ is a C₁ to C₁₃ organic radical preferably containing 1 to 4 heteroatoms such as N, S, O, or halogen.

Another special class of compounds includes the S-(α-substituted imido) ethyl esters of thiophosphorus acids

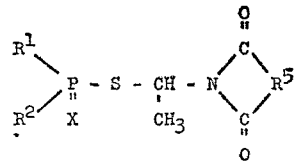

wherein R¹ and R² are as previously defined; and R⁴ is a C₁ to C₁₂ organic radical, preferably alkylene, such as ethylene, phenylene, substituted phenylene, cyclo alkylene such as cyclohexylene, heterocyclic groups, and substituted heterocyclic groups, etc.

In yet another embodiment, the following compositions are within the scope of this invention:

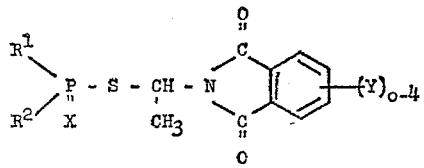

wherein the meaning of the symbols R¹, R² and X is as previously defined except that Y is H, Cl, Br, I, F, or NO₂.

In still a further embodiment, the following compositions are within the scope of this invention:

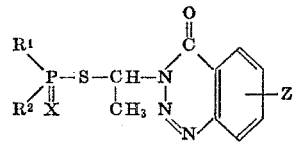

wherein the meaning of the symbols R¹, R², and X is as previously defined and Z is H, Cl, or CH₃;

In still another embodiment there are included compositions of the following formula:

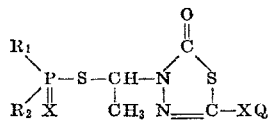

wherein the meaning of the symbols R¹, R², and X is as previously defined and Q is C₁ to C₄ alkyl, phenyl, benzyl, etc.

In yet another embodiment there are included compositions of the following general formula:

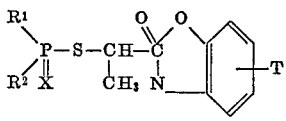

wherein the meaning of $R^1$, $R^2$ and X is as previously defined and T is H, Cl, Br, I, F, or $NO_2$.

In still a further embodiment there are included compositions of the following general formula:

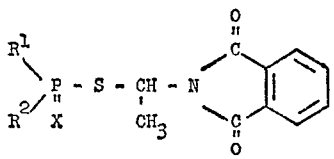

wherein X is S or O; and $R^1$ and $R^2$ are $C_2$ to $C_4$ unsubstituted and monosubstituted organic radicals, preferably alkyloxy, alkylthio or alkyl radicals and most preferably, $R^2$ is $C_1$ to $C_2$ alkyloxy while $R^1$ is $C_1$ to $C_4$ alkyloxy, alkylthio or alkyl.

The novel compositions of the present invention are also claimed generally as pesticides. Some of these compositions are particularly useful in this respect. In general, it is preferred that the molecular weight of the novel pesticidal compositions be below 600. In the general formula of the compositions m and n are 1, 2, preferably 1.

With regard to the diorgano groups, $R^1$ and $R^2$, it is preferred that they should have one to eight carbon atoms. More preferably, $R^1$ and $R^2$ should be $C_1$ to $C_4$ unsubstituted and monosubstituted alkyloxy and/or alkylthiogroups, most preferably methyloxy, ethyloxy, methylthio, propylthio, ethylthio, etc. In preferred pesticidal compositions, $R^3$ is a $C_1$ to $C_{14}$ divalent organic radical forming a cycle with the nitrogen, e.g. a composition containing S($\alpha$-cyclic nitrogen substituted) ethyl groups. Preferred

substituents include cyclic imido and amino groups such as substituted and nonsubstituted phthalimido, succinimido, tetrahydrophthalimido, N-3,4-dihydro-4-oxo 1,2,3-benzotriazinyl, benzoxazol-2(3H)-onyl, 1,3,4-thiadiazol-5 (4H)-onyl, etc.

As previously noted, the novel compositions of this invention are surprisingly effective as pesticides and show unexpected advantages over their known desmethyl analogs. In the case of the S-($\alpha$-N-phthalimido)-ethyl esters of thiophosphorus acids, it is particularly surprising to find fungicidal activity which is absent in the case of the desmethyl analogs. It is also surprising that the above esters show a superior activity against the larvae of the Mexican bean beetle although similar activity cannot be observed for the desmethyl analogs.

Although the present pesticidal compositions, in a formal sense appear to be somewhat similar to known compounds, nevertheless there are significant physico-chemical differences which are normally absent in simple homologs. As a result of the presence of the methyl group in the present compositions, their carbon atom next to the nitrogen is optically active, which is a fact that results in several imporant consequences. For example, in the case of the S-($\alpha$-N-phthalimido) ethyl esters, some of the hydrogens of the diorgano thiophosphorus acid group become magnetically nonequivalent. It has been found that the new compositions having one or more optically active carbon atoms show unexpected biological properties.

The unexpected pesticidal properties of the present compositions are achieved without a parallel increase of their toxicity towards warm blooded animals or higher plant organisms. Consequently, they have a more favorable therapeutic index. This is important not only with regard to the safety of their application for pest control in plants, but to their use as animal health agents.

When used as insecticides and/or fungicides, the biologically active ingredients of this invention are preferably formulated with a suitable carrier or diluent or combination thereof.

The term "carrier" or "diluent" as used herein means a material, which can be inorganic or organic and synthetic or of natural origin, with which the active ingredient of this invention can be mixed or formulated with facilitated storage, transportation and handling, and application to the insects to be treated. The carrier is preferably biologically and chemically inert, and, as used, can be a solid or a fluid. When solid carriers are used, they are preferably particulate, granular, or pelleted; however, other shapes and sizes of solid carriers can be employed as well. So that preferably solid carriers can be natural occurring materials—although subsequently subjected to grinding, sieving, purification, and or other treatment—including, for example, gypsum; tripolyte; diatomaceuos earth; mineral silicate such as mica, vermiculite, talc and pyrophyllite; clays of the montmorillonite, kaolinite, or attapulgite groups; or calcite and dolomite; etc. Carriers produced synthetically, as, for example, synthetic hydrated silica oxides and synthetic calcium silicates can also be used, and many propietary products of this type are available commercially. The carrier can also be an elemental substance such as sulfur or carbon, preferably an activated carbon. If the carrier possesses intrinsic catalytic activity such that it would decompose the active ingredient, it is of advantage to incorporate a stabilizing agent, as for example, polyglycols such as diethylene glycol, to neutralize this activity and thereby prevent possible decomposition of the active ingredient.

For some purposes, a resinous or waxy carrier can be used, preferably one which is solvent-soluble or thermoplastic, including fusible. Examples of such carriers are natural or synthetic resins such as a coumarin resin; rosin; copal; shellac; dammar; polyvinyl chloride; styrene polymers and copolymers; a solid grade of polychlorophenol such as is available under the registered trademark "Arochlor," a bitumen; an asphaltite; a wax, for example, bees wax, or a mineral wax such as paraffin wax or Montan wax, or a chlorinated mineral wax or a microcrystalline wax such as those available under the registered trademark "Mikrovan Wax." Compositions comprising said resinous or waxy carriers are preferably in granular or pelleted form.

Fluid carriers can be liquids, as for example, water, or an oragnic fluid, including a liquefied normally vaporous or gaseous material, and can be solvents or nonsolvents for the active material. For example, the horticultural petroleum spray oils falling in the range of from about 275° F. to about 575° F., or boiling in the range of from about 575° F. to about 1000° F. and having an unsulfonatable residue of at least about 75% and preferably of at least about 90%, or mixtures of these two types of oils, are particularly suitable liquid carriers.

The carrier can be mixed or formulated with the active material during its manufacture or at any stage subsequently. The carrier can be mixed or formulated with the active material in any proportion depending upon the nature of the carrier. One or more carriers, moreover, can be used in combination.

The compositions of this invention can be concentrated, suitable for storage and transport, and contain, for example, from about 5 to about 95% by weight of the active ingredient, preferably from about 20 to about 80% by weight. These concentrates can be diluted with the same or a different carrier to a concentration suitable for application in a manner well known in the art. The compositions of this invention can also be dilute compositions suitable for application. In general, concentrations of about 0.1 to about 10% by weight of the active material based upon the total weight of the composition, are satisfactory, although lower and higher concentrations can be applied if necessary. The compositions of this invention can also be formulated as dusts. These comprise an admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or different finely powdered carriers, which can be of lower sorptive capacity, to a concentration suitable for application.

The compositions of this invention can also be formulated as wettable powders comprising a major proportion of the active ingredient mixed with a dispersant, i.e., a deflocculating or suspending agent, and, if desired, a finely divided solid carrier and/or a wetting agent. The active ingredient can be in particulate form or adsorbed on the carrier and preferably constitutes at least about 10%, more preferably at least about 35%, by weight of the final pesticidal composition. The concentration of the dispersing agent should in general be between about 0.5 and about 5% by weight of the total composition, although larger or smaller amounts can be used if desired.

The dispersing agent used in the compositions or formulations of this invention can be any substance having definite dispersant, i.e., deflocculating or suspending, properties as distinct from wetting properties, although the substances can also possess wetting properties as well.

The dispersant or dispersing agent used can be a protective colloid such as gelatin, glue, casein, gums, or a synthetic polymeric material such as polyvinyl alcohol, methyl cellulose, etc. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aromatic sulfonic acids, for example, the products known as "Tamol 731," are also suitable.

The wetting agents used can be non-ionic type surfactants, as for example, the condensation products of fatty acids containing at least 12, preferably 16 to 20, carbon atoms in the molecule, or abietic acid or naphthenic acid obtained in the refining of petroleum oil fractions with alkylene oxides such as ethylene oxides or propylene oxides, or with both ethylene oxide and propylene oxide, as for example, the condensation products of oleic acid and ethylene oxide containing about 6 to 15 ethylene oxide units in the molecule. Other non-ionic wetting agents like polyalkylene oxide polymers, commercially known as "Pluronics" can be used. Partial esters of the above acids with polyhydric alcohols such as glycerol, polyglycerol, sorbitol or mannitol, etc., can also be used.

Suitable anionic wetting agents include the alkali metal salts, preferably sodium salts, of sulfuric acid monoesters or sulphonic acids containing at least 10 carbon atoms in a molecule; for example, the sodium secondary alkyl sulfates, dialkyl sodium sulfosuccinates available under the registered trademark "Teepol," sodium sulfonates, castor oil, sodium dodecylbenzene sulfonate, etc.

Granulated or pelleted compositions comprising a suitable carrier having the active ingredient incorporated therein are also included in this invention. These can be prepared by impregnating a granular carrier with a solution of an active ingredient or by granulating a mixture of a finely divided carrier and the active ingredient. The carrier used can contain a fertilizer or a fertilizer mixture, such as for example, a superphosphate.

The compositions of this invention can be formulated also as solutions of the active ingredient and an organic solvent or mixtures of solvent, such as for example, alcohols; ketones, especially acetones; ethers; hydrocarbons; etc. When the toxicant itself is a liquid, it can be sprayed upon the insects of fungi without further dilution.

Petroleum hydrocarbon fractions used as solvents should preferably have a flash point of about 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersions of the active ingredients in an organic liquid, preferably a water-insoluble organic liquid containing an added emulsifying agent. These concentrates can also contain a proportion of water, for example, 50% by volume, based upon the total composition to facilitate subsequent dilution with water. Suitable organic liquids include, e.g., the above petroleum hydrocarbon fractions previously described.

The emulsifying agents or emulsifiers are generally of the type producing water-in-oil type emulsions which are suitable for application by low volume spraying, or they can be emulsifiers of the type producing oil-in-water emulsions producing concentrates which can be diluted with relatively large volumes of water for application by high volume spraying or relatively small volumes of water for low volume spraying. In such emulsions, the active ingredient is preferably in a non-aqueous phase.

The present invention is further illustrated in further detail by the following examples, but it is to be understood that the present invention, in its broadest aspects, is not necessarily limited in terms of the reactants or catalysts employed, or specific temperatures, residence times, separation techniques, and other process conditions, etc.; or dosage levels, exposure times, fungi or insects used, etc., by which the compounds and/or formulations or compositions described and claimed are prepared and/or used.

EXAMPLE 1

General procedure for the cationic addition of dialkyl dithiophosphoric acids to vinyl phthalimide To 0.105 mole of the stirred, liquid acid reactant, 17.3 g. (0.1 mole) of crystalline N-vinyl phthalimide was added. In the lower dialkyl dithiophosphoric acids, the N-vinyl compound was dissolved in 2–4 hours. The progress of the reaction was indicated by the increasing viscosity of the reaction mixture. Proton nuclear magnetic resonance spectroscopy (NMR) of samples in carbontetrachloride solution indicated that the reaction was complete in 24 hours.

The crude product was taken up in a tenfold amount of ether and washed with a 5% aqueous sodium hydrogen carbonate solution to remove any residual acid. The ether phase was then dried over anhydrous sodium sulfate. The solvent was removed in vacuo at 40° C. using a film evaporator, to obtain the neutral residual product.

In the case of the dialkyl dithiophosphoric acid adducts, the residual products solidified on standing at room temperature. Their yield was 80–95% of the theoretical. These crude dialkyl dithiophosphates were recrystallized from 2–3 volumes of the appropriate alcohol. The recrystallized products were obtained with a loss of 5–20% by suction filtration of cold (−20° C.) alcoholic mixtures, followed by washing with cold alcohol. As shown in Table I below, the products had a melting range of 1–2°. Elemental analyses for carbon and nitrogen agreed with the calculated compositions. NMR spectroscopy indicated that the products were substantially pure cationic adducts of dialkyl dithiophosphoric acid and the N-vinyl compound.

EXAMPLE 2

Cationic addition of dialkyl monothiophosphoric acids to N-vinyl phthalimide at ambient temperatures Lower dialkyl monothiophosphoric acids were reacted with N-vinyl phthalimide in the manner described in the previous example. After one day, the N-vinyl phthalimide conversion was about 75% as indicated by NMR.

Removal of the unconverted acid from the diethyl monothiophosphoric acid adduct by extraction of its ether solution with aqueous sodium hydrogen carbonate resulted in a liquid neutral product, composed of 75 mole percent of the desired adduct and 25 mole percent of N-vinyl phthalimide.

EXAMPLE 4

Cationic addition of O-methyl ethanedithiophosphonic acid to N-vinyl phthalimide To 14.6 g. (0.105 mole) of liquid O-methyl ethanedithiophosphonic acid, 17.3 g. (0.10 mole) of N-vinyl phthalimide was added with stirring during the course of 15 minutes. The stirred mixture became homogeneous in 2 hours. The components were allowed to react for 19 hours. Subsequent examination of a sample of the liquid mixture by NMR indicated that 75% of the vinyl phthalimide did react.

The mixture was dissolved in 200 ml. of ether and washed acid free with 50 ml. of 5% aqueous sodium hydrogen carbonate solution. After drying over anhydrous sodium sulfate, the ether was removed in vacuo. When the traces of volatiles were removed at 0.2 mm. from a 60° C. bath, 27 g. of the crude neutral ester adduct remained. Its NMR spectrum showed that it consisted of about 82% of the cationic adduct. On recrystallizing it by dissolution in methanol at room temperature and crystallization by cooling to —20° C., 19 g. (57%) of the purified adduct having a melting point of 64–66° C. was obtained.

*Analysis.*—Calculated for $C_{13}H_{16}NO_3PS_2$ (percent): C, 47.40; H, 4.90; N, 4.25; P, 9.40. Found (percent): C, 47.51; H, 4.94; N, 4.34; P, 9.51.

EXAMPLE 5

Cationic addition of diphenyl dithiophosphinic acid to N-vinyl phthalimide

A solution of 27 g. (0.1 mole) of diphenyl dithiophosphinic acid and 17.3 g. (0.1 mole) of N-vinyl phthalimide in 25 g. acetonitrile was heated for 2 hours at 80° C. A subsequent NMR study of the reaction mixture indicated 80% vinyl phthalimide conversion. The appearance of a

TABLE I

[Yields, melting points and elemental composition of dialkyl dithiophosphoric acid—N-vinyl phthalimide adducts]

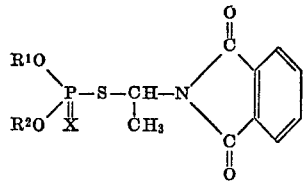

| | | Yield, | | Analysis | | | | | | | |
|---|---|---|---|---|---|---|---|---|---|---|---|
| | | | | Calculated | | | | Found | | | |
| R¹ and R² | X | percent | M.P., ° C. | C | H | N | S | C | H | N | S |
| CH₃ | S | 75 | 66.5–67.5 | 43.50 | 4.25 | 4.22 | 19.36 | 43.61 | 4.31 | 4.37 | 19.46 |
| CH₃CH₂ | S | 74 | 67–68 | 46.79 | 5.04 | 3.89 | 17.85 | 46.99 | 5.09 | 3.91 | 17.98 |
| (CH₃)₂CH | S | 71 | 75.5–77 | 49.60 | 5.72 | 3.61 | 16.56 | 50.02 | 6.00 | 3.64 | 16.56 |

The structures of this and other similar adducts were indicated by their NMR spectra. Characteristic NMR parameters are shown in Table II. The data indicate that appearance of a doublet signal having a coupling constant, J, of about 7 cycles per second at a chemical shift value of approximately 1.8–1.9 parts per million from tetramethyl silane is diagnostic for the cationic adducts.

The spectra of all the compounds were characteristically different from those of the known desmethyl compounds. They showed different signals for the two O-alkyl groups, thereby indicating their magnetic non-equivalence.

EXAMPLE 3

Cationic addition of diethyl dithiophosphoric acid to N-vinyl phthalimide in ethanol To a stirred solution of 44.6 g. crude (80%) diethyl dithiophosphoric acid (0.2 mole) in 100 ml. anhydrous ethanol, 34.6 g. (0.2 mole) of N-vinyl phthalimide was added. A clear, homogeneous solution resulted, which was allowed to stand at room temperature overnight. Precipitation of the crystalline adduct on standing indicated a substantial conversion.

The heterogeneous mixture was cooled to —20° C., filtered with suction and the crude crystalline product was washed with cold methanol. The adduct was then recrystallized from 120 ml. of ethanol to yield 47 g. (66%) of the purified product melting at 67–68° C.

Dimethyl dithiophosphoric acid was also added to N-vinyl phthalimide in a methanolic solution using the above procedure.

TABLE II

[Proton nuclear magnetic resonance parameters of dialkyl mono- and dithiophosphoric acid—n-vinyl phthalimide adducts]

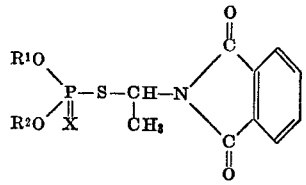

| | | | | | Chemical shifts of structural fragments ª, p.p.m. [in ca. 30% CCl₄, downfield from (CH₃)₄Si] | | | | | |
|---|---|---|---|---|---|---|---|---|---|---|
| | | | Nonequivalent O-alkyl | | | | | | | |
| Example | X | R₁ and R₂ | CH₃ | CH₂O(CHO) | CH₃ | CH₂O(CHO) | Methyl | Methine | Aromatic |
| 1 | S | CH₃ | d 3.54 ᵇ | -- | d 3.80 ᵇ | -- | d 1.87 ᶜ | Dq 5.72 ᶜᵈ | s 7.8 |
| 1 | S | CH₃CH₂ | t 1.17 ᶜ | m 4.04 | t 1.37 | m 4.04 | d 1.87 ᶜ | Dq 5.77 ᶜᵈ | s 7.8 |
| 1 | S | (CH₃)₂CH | {d 1.14 ᶜ, d 1.24 ᶜ} | {m 4.12 ᶠ, Ah 4.88 ᶜ} | {d 1.33 ᶜ, d 1.37 ᶜ} | (Ah 4.78 ᶜ) | d 1.87 ᶜ | Dq 5.80 ᶜᵈ | s 7.8 |
| 2 | O | CH₃CH₂ | t 1.22 ᶜ | m 4.08 ᶠ | t 1.32 ᶜ | m 4.08 | d 1.91 ᶜ ᵍ | m 5.80 ᶜ ᵈ | s 7.8 |

ª Abbreviations of the type of signal splitting observed: s=singlet; d=doublet; t=triplet; m=multiplet; Dq=doublet quartet; Ah=apparent heptet.
ᵇ J_{CH₃OP} 11 cps. ᶜ J_{CHCH₃} 7 cps. ᵈ J_{CHSP} 13 cps. ᵉ J_{CH₃CH₂} 7 cps.
ᶠ The splitting pattern of the complex could not be recognized.
ᵍ Remote coupling by the phosphorus, J_{CH₃(CHSP)} 1 cps.

doublet methyl signal at 1.8 p.p.m. showed that the product was the corresponding cationic adduct, i.e. S-(α-N-phthalimido) ethyl diphenyl dithiophosphinate.

EXAMPLE 6

Free radical addition of diethyl dithiophosphoric acid to N-vinyl phthalimide

A solution of 20.5 g. (0.11 mole) of distilled diethyl dithiophosphoric acid and 17.3 g. (0.10 mole) of vinyl phthalimide in 62 g. dimethyl sulfide was irradiated in a 12° C. water bath with a 75 watt Hanau immersion lamp having a mercury arc emitting a wide spectrum of ultraviolet irradiation from a 5 cm. distance for 72 hours. The reaction mixture was then diluted with 600 ml. ether and washed with 200 ml. 5% aqueous sodium hydrogen carbonate solution. The ether phase was dried over sodium sulfate and distilled to remove all the volatiles. After 3 hours at 60° C., under 0.1 mm., 30 g. (83%) of a neutral, yellow liquid residual product was obtained.

NMR showed that the product is a mixture of the ionic and the free radical type adducts, i.e. the S-(β- and α-phalimido)-ethyl esters. The radical adduct was separated from the ionic adduct isomer by recrystallization from ethanol at —20° C.

EXAMPLE 7

Cationic addition of diethyl dithiophosphoric acid to N-vinyl pyrrolidone

To 37.2 g. (0.2 mole) of purified diethyl dithiophosphoric acid, 22.2 g. (0.2 mole) of N-vinyl pyrrolidone was added dropwise with stirring. An immediate exothermic reaction started on addition; the temperature was kept below 20° C. by ice-water cooling during the addition. After the addition, the mixture was allowed to stand at room temperature for 3 hours. Subsequent analysis by NMR showed that no vinyl pyrrolidone was left unreacted and that an essentially pure cationic adduct was formed. The S-(α-N-pyrrolidonyl)-ethyl diethyl dithiophosphate structure of the adduct was indicated by a double quadruplet for the methine proton at 5.77 p.p.m. with $J_{CHCH_3}$ =7 c.p.s. and $J_{CHSP}$=11 c.p.s., and a doublet for the adjacent methyl protons at 1.61 p.p.m.

EXAMPLE 8

Cationic addition of diethyl dithiophosphoric acid to N-vinyl carbazole

To 44.64 crude 80% diethyl dithiophosphoric acid (corresponding to 0.2 mole pure acid), 38.6 g. (0.2 mole) of vinyl carbazole was added in portions with stirring. An immediate exothermic reaction took place on addition. During the addition of the second half of the solid vinyl compound, however, the reaction mixture became very viscous. To dissolve all the vinyl reactant the mixture was stirred for four days at room temperature. Nevertheless, about 1.6 g. of the lumpy vinyl carbazole remained undissolved. NMR of the liquid product mixture showed the presence of about 60% of the cationic adduct, i.e. S-(α-N-carbazyl)-ethyl diethyl dithiophosphate. The diagnostic signals were for the methine protons (quadruplet at 6.4 p.m.; $J_{CHCH_3}$=7 c.p.s., $J_{CHSP}$=13 c.p.s.) and the methyl protons on the adjacent carbon (doublet at 2.02 p.p.m.). The intensity of the latter signal served as a means of semiquantitative NMR analyses.

The adduct was isolated by recrystallization from ethanol. The major by-product, an insoluble solid in hot ethanol, was found to be polyvinylcarbazole.

Elemental analysis. — Calculated for $C_{18}H_{22}NO_2PS_2$ (percent): C, 56.97; H, 5.85; N, 3.69; P, 8.16. Found (percent): C, 58.65; H, 6.03; N, 3.87; P, 7.93.

EXAMPLE 9

Cationic addition of diethyl monothiophosphoric acid to N-vinyl tetrahydrophthalimide Equimolar amounts of the reactants are heated at 60° C. to yield S-(α-N-tetrahydrophthalimido)-ethyl diethyl monothiophosphate, whose identity can be confirmed by NMR.

EXAMPLE 10

Cationic addition of dimethyl dithiophosphoric acid to N-vinyl succinimide

Equimolar amounts of reactants are heated at 70° C. to yield S-(α-N-succinimido) ethyl dimethyl dithiophosphate, whose identity can be confirmed by NMR.

EXAMPLE 11

Free radical addition of diethyl dithiophosphoric acid to N-vinyl succinimide

Equimolar amounts of reactants are irradiated by gamma days at —30° C. to yield S-(β-N-succinimido)-ethyl diethyl dithiophosphate, whose identity can be confirmed by NMR.

EXAMPLE 12

Cationic addition of dimethyl dithiophosphoric acid to N-vinyl 3,4-dihydro-4-oxo-1,2,3-benzotriazine To a stirred acetone solution of the acid an equimolar amount of the vinyl compound is added to produce S-(α-N-3,4-dihydro-4-oxo-1,2,3-benzotriazinyl) ethyl dimethyl dithiophosphate, whose identity can be confirmed by NMR.

EXAMPLE 13

Cationic addition of diethyl dithiophosphoric acid to N-vinyl 6-chloro-benzoxazol-2(3H)-one The reaction of equimolar reagents in the manner described above provides S - (α - N - 6 - chloro-benzoxazol-2(3H)-onyl) ethyl diethyl dithiophosphate, whose identity can be confirmed by NMR.

EXAMPLE 14

Cationic addition of dimethyl dithiophosphoric acid to N-vinyl 2-methoxy-1,3,4-thiadiazole-5(4H)-one The reaction of equimolar reagents in methanol yields S-(α-N-2-methoxy-1,3,4-thiadiazol-5(4H)-onyl) ethyl dimethyl dithiophosphate, whose identity can be confirmed by NMR.

EXAMPLE 15

Cationic addition of dicetyl dithiophosphoric acid to N-vinyl N-methyl chlorobenzenesulfonamide Equimolar amounts of reactants on heating in chlorobenzene solution yield S-α-(N-methyl)-N-chlorobenzenesulfonamido ethyl dicetyl dithiophosphate, whose identity can be confirmed by NMR.

EXAMPLE 16

Cationic addition of O-ethyl methylthiomethane monothiophosphonic acid to N,N-divinyl dimethyl hydantoin To 2 moles of the acid reagent one mole of the divinyl compound is added with stirring to yield N,N'-bis-α-(O-ethyl methylthiomethanephosphonyl thio) ethyl dimethyl hydantoin, whose identity can be confirmed by NMR.

EXAMPLE 17

Cationic adducts for the control of the larvae of the Mexican bean beetle

Preparation of the pesticidal spray emulsions: In the insecticidal and miticidal spray tests the experimental compounds were tested as aqueous emulsions. These emulsions were prepared by dissolving the compound in acetone and dispersing it in distilled water with Triton 171 (a blend of an alkyl aryl polyether alcohol and calcium dodecylbenzene sulfonate) to give spray emulsions containing 250 p.p.m. of the compound. These emulsions were then used in standard laboratory insecticidal and miticidal tests as described hereinafter at the proper dilution levels.

Test method: Bean leaves were dipped in the emulsion of the test chemical and allowed to dry. Individual treated leaves were placed in Petri dishes and four Mexican bean beetle larvae introduced into each of the two replicate dishes. Mortality determinations were made after 3 days. The results are shown in Table III below.

chemical prepared in the manner described in Example 2. As soon as the spray deposit has dried, the plants are removed to the greenhouse and held for a period of 7–10 days. In the systemic protectant tests, instead of spraying the plant the soil in the pot is treated with 20 ml. of the formulation. In both test methods, the amount of rust is rated after 7–10 days in the greenhouse on a scale of 0 to 10, where 0 equals no control and 10 equals complete control.

The results of the tests with the monothiophosphate formulations are shown by Table IV.

TABLE III
[Comparative activity of N-α-phthalimido ethyl and methyl dialkyl dithiophosphates]

$$(RO)_2\underset{\underset{X}{\|}}{P}-S-\underset{\underset{R'}{|}}{CH}-N\begin{array}{c}\overset{O}{\underset{\|}{C}}\\ \\ \underset{\|}{C}\\ O\end{array}\hspace{-1em}\begin{array}{c}\\ \\ \end{array}$$

| Identification | R | X | R' | Conc. of compound, p.p.m. | Mortality of Mexican bean beetle larvae after 3 days, percent |
|---|---|---|---|---|---|
| Imidan for comparison. | CH₃ | S | H | 50 / 10 | 50 / 10 |
| Example 1 | CH₃ | S | CH₃ | 50 / 10 | 100 / 50 |
| Do | C₂H₅ | S | CH₃ | 25 / 10 | 100 / 100 |
| Ethyl-imidan for comparison. | C₂H₅ | S | H | 50 / 10 | 95 / 40 |
| Hercules 14503 for comparison. | C₂H₅ | S | CH₂Cl | 10 | 60 |
| Example 2 | C₂H₅ | O | CH₃ | 25 / 10 | 100 / 100 |
| Example 1 | (CH₃)₂CH | S | CH₃ | 250 | 30 |

The data in Table III show that the new pesticidal compositions have an outstanding effectiveness against the Mexican bean beetle larvae. They are more effective than their desmethyl analogs. The S-(α-N-phthalimido) ethyl diethyl dithiophosphate is also more active than the corresponding chloroethyl compound of Hercules. There is no significant difference between the activity of a diethyl dithiophosphate and a monothiophosphate derivative in the series. Increasing the size of the O-alkyl groups, however, reduces the activity as is shown by the example of the diisopropyl compound.

EXAMPLE 18

S-(α-N-phthalimido)-ethyl diethyl monothiophosphate as a bean rust eradicant

Test method: Potted pinto bean plants with fully expanded primary leaves are inoculated with spores of the bean rust fungus (*Uromyces phaseoli*) and incubated for 24 hours. In the contact eradicant test, the plants are then placed on a revolving turntable and sprayed with the formulations containing various concentrations of the test TABLE IV
[Control of bean rust by the cationic adduct of diethyl monothiophosphoric acid and N-vinyl phthalimide]

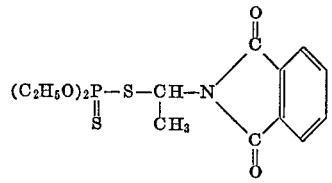

| Parts per million | Control of bean rust, percent | |
|---|---|---|
| | Contact eradicant test | Systemic protectant test |
| 200 | 8 | 10 |
| 100 | 9 | 8 |
| 20 | 8 | 7 |
| 4 | 6 | 6 |

EXAMPLE 19

Cholinesterase inhibition by the cationic adducts of diorgano thiophosphorus acids and N-vinyl compounds Test method: To a solution of 0.2 unit of bovine cholinesterase in 2.97 ml. of a buffer solution containing 11.15 g. of disodium hydrogen phosphate dodecahydrate and 1.81 g. of potassium dihydrogen phosphate per liter of water, 0.03 ml. of a solution of the dithiophosphate adduct in benzene was added. This mixture was then incubated in a water bath at 35° C. for 30 minutes. One ml. of a solution containing 100 mg. of 5,5'-dithiobis-(2-nitrobenzoic acid), 100 mg. of acetylthiocholine iodide, and 75 ml. of the above buffer solution in sufficient water to make 200 ml. was then added and the mixture again incubated in a water bath at 35° C. for 30 minutes more. The amount of inhibition of bovine cholinesterase was then determined from the absorbance of this solution at 420 mμ. By using a series of solutions of the test chemical at various concentrations in acetone, the concentration needed for 50% inhibition was determined.

Since dithiophosphates are generally oxidized in vivo to the corresponding monothiophosphates which are more effective cholinesterase inhibitors, our dithiophosphates were oxidized with peroxide for the in vitro test. The oxidation was carried out with peracetic acid in benzene solution at 75° for 20 minutes. After the removal of the excess peracetic acid, the benzene solution was used for enzyme inhibition as described above.

The median inhibiting concentrations for a number of the novel cationic adducts and for some structurally related known compounds are listed in Table V.

of the representative pests at concentrations which are low enough for economic use.

TABLE V

[Comparative cholinesterase inhibiting activity of adducts of diorgano thiophosphorus acids and N-vinyl compounds]

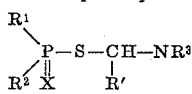

| Identification | $R^1$ | $R^2$ | X | R' | $NR^3$ | Median cholinesterase inhibiting concentration $L_D 50$, mole/liter | |
|---|---|---|---|---|---|---|---|
| | | | | | | Before oxidation | After oxidation |
| Imidan | $CH_3O$ | $CH_3O$ | S | H | phthalimido | $3.4\times10^{-5}$ | $2.4\times10^{-6}$ |
| Example 1 | $CH_3O$ | $CH_3O$ | S | $CH_3$ | phthalimido | $2.0\times10^{-5}$ | $1.1\times10^{-6}$ |
| Do | $C_2H_5O$ | $C_2H_5O$ | S | $CH_3$ | phthalimido | $8.8\times10^{-6}$ | $1.3\times10^{-6}$ |
| Example 2 | $C_2H_5O$ | $C_2H_5O$ | O | $CH_3$ | phthalimido | $4.3\times10^{-7}$ | |
| Example 1 | $i-C_3H_7O$ | $i-C_3H_7O$ | S | $CH_3$ | phthalimido | $1.8\times10^{-5}$ | $2.7\times10^{-6}$ |
| Example 4 | $C_2H_5$ | $CH_3O$ | S | $CH_3$ | phthalimido | $7.2\times10^{-4}$ | $9.2\times10^{-5}$ |
| Example 8 | $C_2H_5O$ | $C_2H_5O$ | S | $CH_3$ | carbazole | $5.6\times10^{-5}$ | $1.0\times10^{-}$ |

Since the insecticidal effectiveness of organophosphorus compounds is generally attributable to cholinesterase inhibition, the median cholinesterase inhibiting concentrations $L_D50$'s are widely used to estimate the insecticidal potential of new organophosphorus compounds. Low $L_D50$'s indicate a potentially high insecticidal effectiveness.

The data of Table V shows that the new S-($\alpha$-N-phthalimido)-ethyl dimethyl mono- and dithiophosphates have a higher insecticidal potential than known compounds of related structure. Due to transport difficulties and other factors, this potential cannot always be realized in vivo. This is shown by the high effectiveness as an enzyme inhibitor of the insecticidally, relatively inactive diisopropyl dithiophosphate compound. Cationic adducts of diorgano thiophosphorus acids to N-vinyl compounds generally show a high pesticidal potential as shown by the cholinesterase inhibition of the N-vinyl carbazole adduct of Example 8.

EXAMPLE 20

Cationic adducts of diorgano thiophosphorus acids with N-vinyl phthalimide as broad spectrum contact insecticides and miticides The adducts of Examples 1, 2 and 4 were examined for effectiveness in controlling the two spotted spider mites representing the pest class of Arachnida (mites), the bean aphids from the order of Monoptera, more specifically from the class of sucking insects and the house fly, a household pest representing the order of Diptera.

For evaluation, the following test methods were used:

Mites: Potted bean plants infested with the two-spotted spider mite were placed on a turntable and sprayed with a formulation of the test chemical. The plants were held for 5 days and the degree of mite control was rated after 2 days.

Aphids: Potted nasturtium plants infested with the bean aphids were placed on a turntable and sprayed with a formulation of the test chemical. The plants were held for 2 days and the degree of aphid control was rated.

Housefly: Caged houseflies were sprayed with the formulated test chemical. After 2 days the degree of housefly control was rated.

The results of the tests are shown by Table VI. The data indicate that the compounds give complete control

EXAMPLE 21

The toxicity of the cationic adduct of dimethyl dithiophosphoric acid with N-vinyl phthalimide In view of the pesticidal activity of the cationic adducts of the present invention, it was of interest to determine their toxicity towards warm blooded animals. Acute oral toxicity determinations were carried out using white albino male rats.

The adduct of dimethyl dithiophosphoric acid and N-vinyl phthalimide was administered orally as 0.5% aqueous suspension with carboxymethyl cellulose by stomach tube to six groups of five male albino rats of the Sprague-Dawley strain weighing from 210 to 260 g.

Food was withheld from the animals for a period of 3–4 hours prior to dosage. Following incubation, the animals were housed by groups in suspended metal cages. Food and water were freely available at all times. The animals were closely observed for mortality and toxic effects at the following intervals after compound administration: immediately; at 1, 4 and 24 hours; and once daily thereafter for a total of 14 days.

TABLE VI

[S($\delta$-N-phthalimido) ethyl diorgano thiophosphorus acid esters as contact insecticides and miticides]

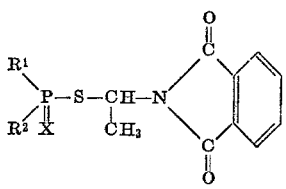

| | | | | Mortality produced, percent | | |
|---|---|---|---|---|---|---|
| $R^1$ | $R^2$ | X | Concentration, p.p.m. | Two spotted spider mites | Bean aphids | House flies |
| $CH_3O$ | $CH_3O$ | S | 50 | 100 | 100 | 100 |
| $C_2H_5O$ | $C_2H_5O$ | S | 25 | 100 | | 100 |
| $C_2H_5O$ | $C_2H_5O$ | O | 50 | 100 | 100 | 100 |
| $C_2H_5$ | $CH_3O$ | S | 250 | 100 | 100 | 100 |

The acute oral toxicity was found to be in the order of 200 mg./kg. It is interesting to observe that the known desmethyl analog of this compound, Imidan, has an acute toxicity of about 150 mg./kg. The unexpected increase of the pesticidal effectiveness of the new adduct, e.g., against bean beetles, is apparently not coupled with a similar increase of its toxicity towards warm blooded animals.

What is claimed is:

1. A compound of the formula

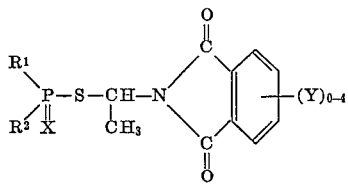

wherein X is selected from the group consisting of sulfur and oxygen, $R^1$ and $R^2$ are $C_1$ to $C_4$ alkyloxy, alkylthio and alkyl radicals, and Y is selected from the group consisting of hydrogen, halogen and $NO_2$.

2. A compound of the formula

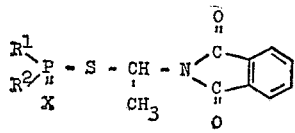

wherein X is selected from the group consisting of sulfur and oxygen; $R^1$ and $R^2$ are each $C_1$–$C_4$ organic radicals selected from the group consisting of alkyloxy, alkylthio and alkyl radicals.

3. A compound according to claim 1 wherein $R^1$ and $R^2$ are $C_1$ to $C_4$ alkyloxy radicals.

4. A compound according to claim 2 wherein $R^1$ and $R^2$ are $C_1$ to $C_4$ alkyloxy radicals.

5. A compound according to claim 2 wherein X is sulfur and $R^1$ and $R^2$ are methyloxy.

6. A compound according to claim 2 wherein X is oxygen and $R^1$ and $R^2$ are ethyloxy.

7. A compound according to claim 2 wherein X is sulfur and $R^1$ is methyloxy and $R^2$ is ethyl.

References Cited

UNITED STATES PATENTS 2,767,194  10/1956  Fancher _____ 260—326

OTHER REFERENCES

Hoaben-Weil, vol. 12/2, pp. 709, 710, 716, 719.

ALEX MAZEL, Primary Examiner

J. A. NARCAVAGE, Assistant Examiner

U.S. Cl. X.R.

260—239.3 R, 243 A, 244 R, 247.7 D, 248 NS, 250 R, 251 P, 276, 281, 301, 302 E, 304, 307 R, 309.2, 309.5, 309.6, 310 R, 308 B, 315, 319.1, 326.5 A, 945, 978; 424—200